(12) United States Patent
Trionfetti

(10) Patent No.: US 11,300,471 B2
(45) Date of Patent: Apr. 12, 2022

(54) BALANCING DEVICE FOR ROTATING BODY

(71) Applicant: BALANCE SYSTEMS S.r.L., Milan (IT)

(72) Inventor: Gianni Trionfetti, AGRATE BRIANZA (IT)

(73) Assignee: BALANCE SYSTEMS S.R.L., Milan (IT)

(*) Notice: Subject to any disclaimer, the term of this patent is extended or adjusted under 35 U.S.C. 154(b) by 154 days.

(21) Appl. No.: 16/590,884

(22) Filed: Oct. 2, 2019

(65) Prior Publication Data

US 2020/0103304 A1 Apr. 2, 2020

(30) Foreign Application Priority Data

Oct. 2, 2018 (IT) .................. 102018000009107

(51) Int. Cl.
*G01M 1/22* (2006.01)
(52) U.S. Cl.
CPC ..................... *G01M 1/22* (2013.01)
(58) Field of Classification Search
CPC ....................................................... G01M 1/22
See application file for complete search history.

(56) References Cited

U.S. PATENT DOCUMENTS

| | | | | |
|---|---|---|---|---|
| 3,675,495 A * | 7/1972 | MacMillan | ............. | G01M 1/28 73/466 |
| 4,513,619 A * | 4/1985 | Widdall | .................. | G01M 1/22 73/455 |
| 4,864,859 A * | 9/1989 | Jensen | ..................... | G01M 1/22 73/473 |
| 5,197,010 A * | 3/1993 | Andersson | ............. | G01M 1/22 464/180 |
| 2003/0040878 A1* | 2/2003 | Rasmussen | ............. | G01D 3/08 702/85 |
| 2004/0019461 A1* | 1/2004 | Bouse | ................ | G05B 23/0229 702/188 |
| 2014/0238128 A1* | 8/2014 | Vosejpka | ................ | G01M 1/16 73/460 |
| 2015/0290772 A1* | 10/2015 | Trionfetti | ............... | B24D 5/165 74/574.2 |
| 2016/0084727 A1* | 3/2016 | Perelman | ................ | G01M 1/34 73/462 |
| 2016/0216171 A1 | 7/2016 | Moakler et al. | | |
| 2017/0328804 A1 | 11/2017 | Eberle et al. | | |
| 2018/0120191 A1 | 5/2018 | Holland et al. | | |

OTHER PUBLICATIONS

The Italian Search Report issued for corresponding Italian Patent Application No. 10201800009107, completed on Jun. 17, 2019, three pages.

* cited by examiner

*Primary Examiner* — Natalie Huls

(74) *Attorney, Agent, or Firm* — Vorys, Sater, Seymour and Pease LLP

(57) ABSTRACT

A balancing device is provided, including acquisition device adapted to detect vibratory stresses generated by the rotating body during rotation, in which the acquisition device are configured to allow the detection of vibratory stresses along at least two mutually non intersecting acquisition directions.

8 Claims, 1 Drawing Sheet

BALANCING DEVICE FOR ROTATING BODY

FIELD OF THE INVENTION

The present invention relates to a balancing device comprising: acquisition means adapted to detect vibratory stresses generated by the rotating body during rotation and configured in such a way as to allow the detection of the vibratory stresses along at least two mutually non intersecting acquisition directions, processing means including a plurality of communication channels adapted to connect the acquisition means and the processing means.

In particular, the present invention relates to a device including a special vibration detection system to allow an optimal balancing of a rotating body.

DESCRIPTION OF THE PRIOR ART

As is well known, balancing devices for rotating bodies generally use sensors to measure the unbalance of the rotating body in order to correct it. These sensors are usually accelerometers adapted to measure vibrations.

The sensor(s) used to detect any vibrations to which the rotating body is subjected are usually arranged on the external surface of the rotating body and are adapted to evaluate the vibrations along the radial direction with respect to it. So, the vibration sensor works substantially perpendicular to the axis of rotation of the body in a preferential direction.

Once the vibrations have been detected during rotation, the extent of the unbalance, to which the rotating body is subjected, can be radially assessed. Once the unbalance has been determined, the balancing masses housed inside the rotating body can be controlled in such a way as to exert an action contrary to the unbalance, so as to cancel or, in any case, reduce the vibrations associated with the body within the pre-established tolerance limits.

The described prior art has a few major drawbacks.

In some applications for machine tools, in particular grinding machines, and in particular for gears, the known art described above may not be optimal due to the variable position of the rotating bodies.

Therefore, a major drawback of the known art is that it does not allow, in any case, the achievement of an extremely high and almost perfect efficiency of the balancing of rotating bodies, apart from some very special cases.

In addition, in machines that process rotating bodies with variable positions, the cutting direction may depend on the workpiece to be machined, for example the shape of the gear tooth profiles, and therefore the optimisation of the use of a single-axis sensor can only be done for a specific position.

In order to adapt the machine to the different positions, the optimisation should be repeated for each type of body or position and would require the sensor to be physically repositioned. However, this is unfeasible on automatic machines of this type.

In this context, the technical task underlying the present invention is to devise a balancing device for rotating bodies, which is capable of substantially obviating at least some of the above-mentioned drawbacks.

Within the sphere of said technical purpose one important aim of the invention is to provide a balancing device that enables a highly precise balancing of the rotating body.

Another important aim of the invention is to provide a balancing device that allows an efficient balancing of the imbalances due to the vibrations to which a rotating body is subjected, in a very short time.

In conclusion, an important aim of the invention is to provide a device that is capable to adapt itself to the different types of position depending on the body being machined, without requiring physical repositioning.

SUMMARY OF THE INVENTION

The technical purpose and specified aims are achieved by balancing device comprising: acquisition means adapted to detect vibratory stresses generated by the rotating body during rotation and configured in such a way as to allow the detection of the vibratory stresses along at least two mutually non intersecting acquisition directions, processing means including a plurality of communication channels adapted to connect the acquisition means and the processing means, each of the communication channels being associated with a vibratory stress in each of the acquisition directions, and the processing means weighing the input signals related to the vibratory stresses with respect to the positions of the device selecting the vibratory stresses, when applicable.

BRIEF DESCRIPTION OF THE DRAWINGS

The characteristics and benefits of the invention will be clarified in the following detailed descriptions of some preferred embodiments of the invention, with reference to the accompanying drawings, wherein.

DESCRIPTION OF THE PREFERRED EMBODIMENTS

Figure 1:
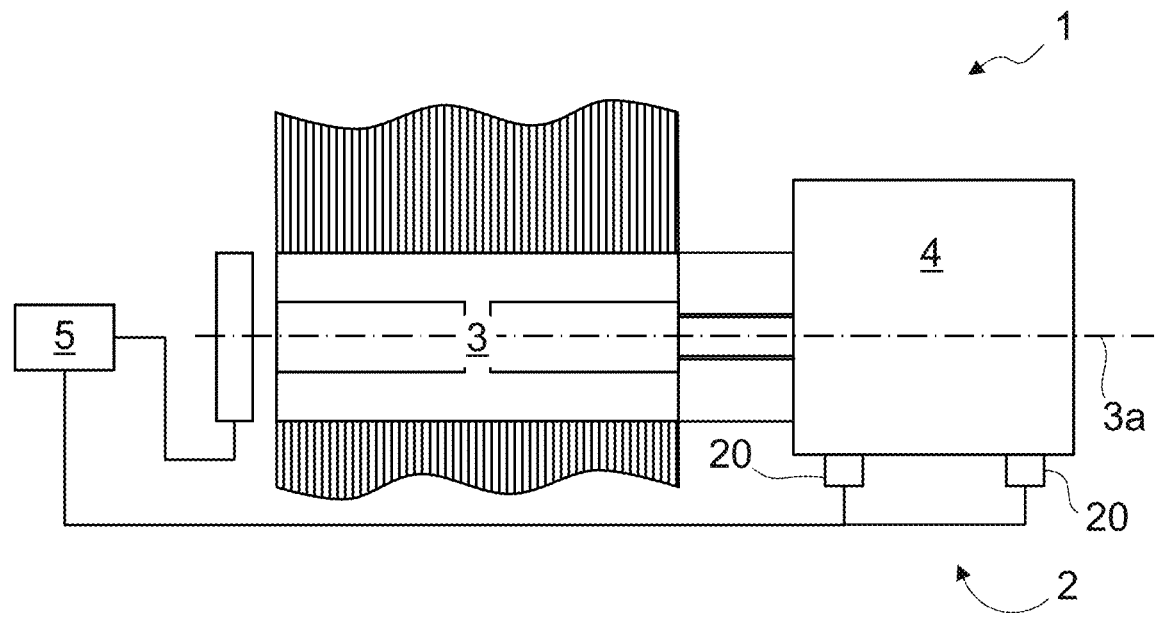
FIG. 1 shows a functional diagram of a balancing device according to the invention.
Figure 2:
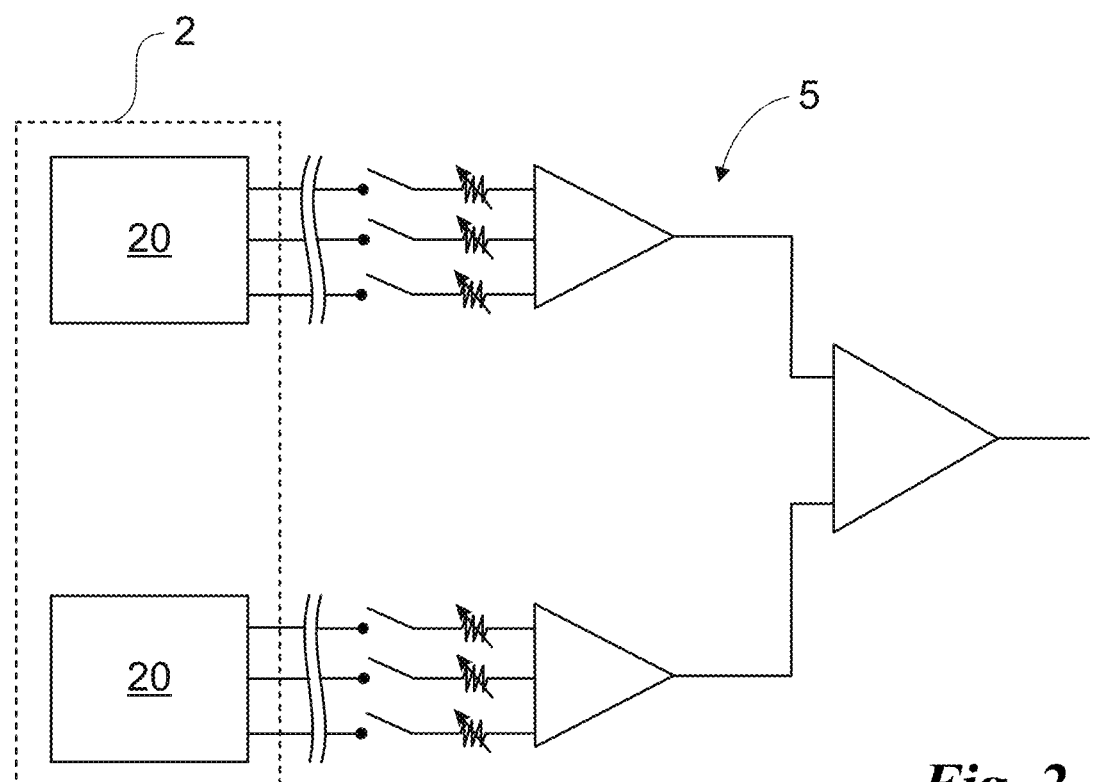
FIG. 2 shows a diagram of the processing means of a balancing device according to the invention.

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference with which it is associated. For example, these terms, if associated with a value, preferably indicate a divergence of not more than 10% from said value.

Furthermore, when used, terms such as "first", "second", "higher", "lower", "main" and "secondary" do not necessarily identify an order, a priority relationship or a relative position, but can simply be used to distinguish more clearly the different components from each other.

The measurements and data contained in this text are to be considered, unless otherwise indicated, as carried out in ICAO International Standard Atmosphere (ISO 2533:1975).

With reference to the Figures, the balancing device according to the invention is indicated as a whole by the numeral 1.

The device 1 is preferably adapted to be associated with a processing machine acting on a rotating body 4.

The rotating body 4 can be of any type, for example a spindle carrying a machining tool, such as a grinding wheel, and can be adapted to interact with a rotating shaft comprising one or more gears or other workpieces normally being machined. The processing machine can therefore be a grinding machine or a machine of another type which is adapted to use rotating bodies 4 for example for removal machining. The device 1 preferably further comprises acquisition means 2.

The acquisition means 2 are adapted to detect the vibratory stresses generated by the rotating body 4 during rotation. These vibratory stresses can therefore extend in any direction. For example, they can extend radially with respect to the rotating body 4, or they can develop components being substantially parallel to the rotating body 4 itself.

Preferably, the acquisition means 2 are configured in such a way as to allow the detection of vibratory stresses along at least two mutually non parallel acquisition directions.

More in detail, the acquisition means 2 are configured in such a way as to allow the detection of vibratory stresses along three mutually perpendicular acquisition directions defining an ordered triad.

In order to detect stresses in different directions, the acquisition means 2 may include one or more sensors 20.

The sensor 20 is a sensor adapted to detect the vibratory stress in at least one acquisition direction. It is preferably an accelerometer.

The device 1 can therefore include a plurality of sensors 20 for each acquisition direction, having substantially a sensor 20 dedicated in particular to a single component of the vibratory stresses.

Otherwise, the device 1 can include a sensor 20 configured to detect the components along all acquisition directions of the stresses.

In detail, the sensor 20 is preferably a multi-axial accelerometer, more preferably a biaxial and most preferably a triaxial accelerometer. An example of such sensors is given by a PCB-IMI accelerometer—model 354C03.

Appropriately, the sensor 20 is arranged on the rotating body 4 and moves integrally therewith in such a way as to record all the vibrations of the rotating body 4 itself. The device 1 further comprises balancing means 3.

The balancing means 3 are balancing heads known in the current state of the art and can include various types of technologies.

For example, the balancing heads may be of the type described in the applicant's patent application EP-A-12187044.

In general, the balancing heads are apparatuses adapted to compensate for any vibratory stresses to which the rotating body 4 is subjected, by means of movable masses that compensate for force imbalances.

The balancing means 3 are then arranged inside or at the rotating shaft of the rotating body 4, or even outside it.

Preferably, the balancing means 3 define a balancing axis 3*a*.

The balancing axis 3*a* substantially corresponds to the axis of rotation of the rotating body 4 and is the axis around which the balancing masses are moved.

Preferably, the balancing means 3 are therefore adapted to balance the rotating body 4 around the balancing axis 3*a*.

Therefore, the at least two acquisition directions of the acquisition means 2 preferably define an acquisition plane perpendicular to the balancing axis 3*a*.

If the acquisition means 2 define an ordered triad, an acquisition direction may suitably correspond with the balancing axis 3*a*.

The device 1 further comprises processing means 5.

The processing means 5 are operatively connected to the acquisition means 2 and the balancing means 3. In particular, they are configured to operate the balancing means 3 in such a way as to compensate for vibratory stresses.

The processing means 5 are also substantially known in the current state of the art and may include computers, CNCs, and other common technologies.

In detail, the processing means 5 preferably include a plurality of communication channels.

The communication channels consist of electronic connections connecting the acquisition means and the balancing means 3. In particular, they connect sensors 20 to the processing means 5.

In addition, each communication channel is preferably associated with a single acquisition direction. In this way, the signals related to vibratory stresses reach the processing means 5 divided into separate channels. However, additional electronic equipment may be provided to ensure mixing of components outside the processing means 5, allowing only one or more resulting signals to be brought to the processing means 5.

Preferably, the communication channels each comprise at least one switch and one potentiometer. These switches and potentiometers can be either analogue or digital. The processing means 5 can substantially exclude the signal relating to a specific channel or can attenuate the signal with the potentiometer.

Therefore, the processing means 5 are capable of weighing the input signals relating to the vibratory stresses with respect to the positions of the device 1.

In particular, the processing means 5 can substantially select the relevant vibratory stresses.

Preferably, the processing means 5 select the vibratory stresses that act perpendicularly to the balancing axis 3*a*. They may only select such stresses, if required.

In any case, the processing means 5 allow to exclude, include or adjust each of the vibratory stresses or—to be more precise—of the components associated with the overall vibratory stress in the acquisition directions.

The invention comprises a new method for balancing a rotating body 4.

In particular, the method includes the device 1 and at least one acquisition step and one selection step.

In the acquisition step, the acquisition means 3 detect the vibratory stresses along the acquisition directions, whether they are one, two, three or more.

In the selection step, the processing means 5 select the vibratory stresses that act in a preferred direction, e.g. perpendicular to the balancing axis 3*a*. In this way, the relevant actual component can be defined with respect to the rotating body 4 in such a way that the balancing means 3 can be activated proportionally.

In addition, during the selection step, the processing means 5 may exclude, include or adjust each of the vibratory stresses. Therefore, the various components along the acquisition directions can be weighed, depending on the position of the device 1, either manually by an operator or automatically by the processing means 5.

Alternatively, or in addition, the method could also comprise a calculation step in which the resulting vibratory stress is determined by a vector sum.

The balancing device 1 according to the invention achieves important advantages. In fact, the device 1 is capable to follow practically every working position of the processing machine without having to manually locate the sensors 20 according to the position of the machine.

Therefore, a consequent advantage is that it allows a very efficient balancing during machining, with very short balancing times.

The device 1 allows to obtain a very highly precise balancing due to the fact that any vibrations outside the section plane can be correctly assessed and balanced considering only the components in the plane, i.e. those which are relevant and on which the balancing masses inside the balancing heads can act.

The invention is susceptible of variations falling within the scope of the inventive concept as defined by the claims.

In this context, all details are replaceable by equivalent elements, and the materials, shapes and dimensions may be any materials, shapes and dimensions.

The invention claimed is:

1. A processing machine including:
   a rotating body defining variable positions in respect of the rest of the processing machine, and
   a balancing device, comprising:
      acquisition means adapted to detect vibratory stresses generated by said rotating body during rotation and configured in such a way as to allow the detection of said vibratory stresses along at least two mutually non parallel acquisition directions,
      processing means including a plurality of separated communication channels adapted to connect said acquisition means and said processing means,
      each of said communication channels including a switch and a potentiometer and being associated with a vibratory stress in each of said acquisition directions, and
      said processing means weighing the input signals related to said vibratory stresses by excluding, independently from each other, one or more of the signal relating to a specific channel with the switch or attenuating, independently from each other, one or more of the signals with the potentiometer with respect to the positions of said device selecting said vibratory stresses.

2. The processing machine according to claim 1, wherein said acquisition means are configured in such a way as to allow the detection of said vibratory stresses along three mutually perpendicular acquisition directions defining an ordered triad.

3. The processing machine according to claim 1, comprising balancing means defining a balancing axis and adapted to allow the balancing of said rotating body around said balancing axis, in which said two acquisition directions define an acquisition plane perpendicular to said balancing axis.

4. The processing machine according to claim 1, wherein said acquisition means comprise a sensor configured to detect the components along all said acquisition directions of said vibratory stresses.

5. The processing machine according to claim 1, wherein said acquisition means comprise a single sensor for each of said acquisition directions.

6. The processing machine according to claim 5, wherein said sensor is a three-axis accelerometer.

7. The processing machine according to claim 1, wherein the processing machine is a grinding machine, wherein the rotating body comprises a grinding wheel.

8. The processing machine according to claim 1, wherein the rotating body comprises a spindle carrying a machine tool.

* * * * *